Dec. 22, 1953      F. ROMAIN      2,663,446
MOTOR VEHICLE PARKING ELEVATOR
Filed Nov. 9, 1949      5 Sheets—Sheet 1
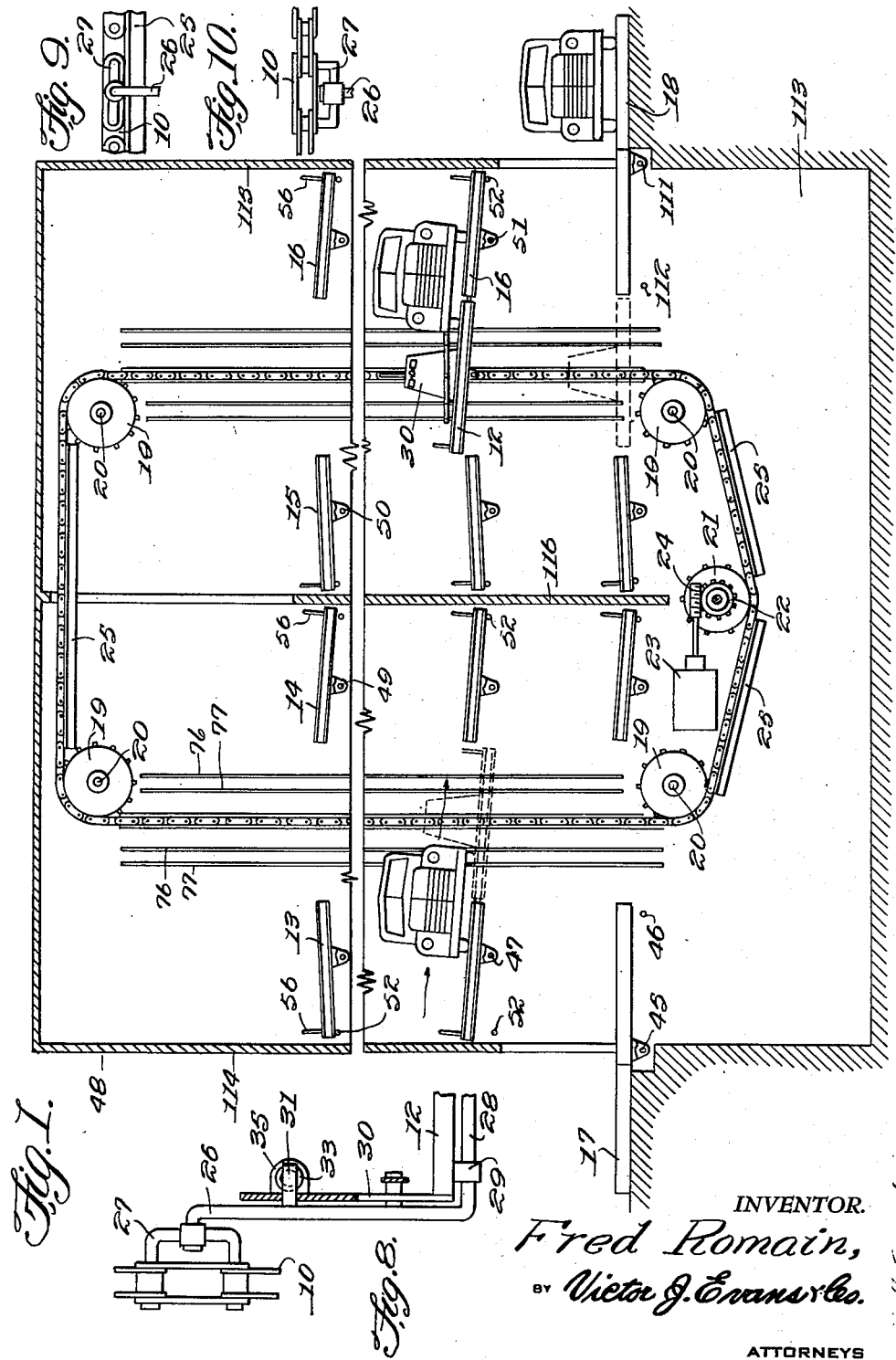
INVENTOR.
Fred Romain,
BY Victor J. Evans & Co.
ATTORNEYS

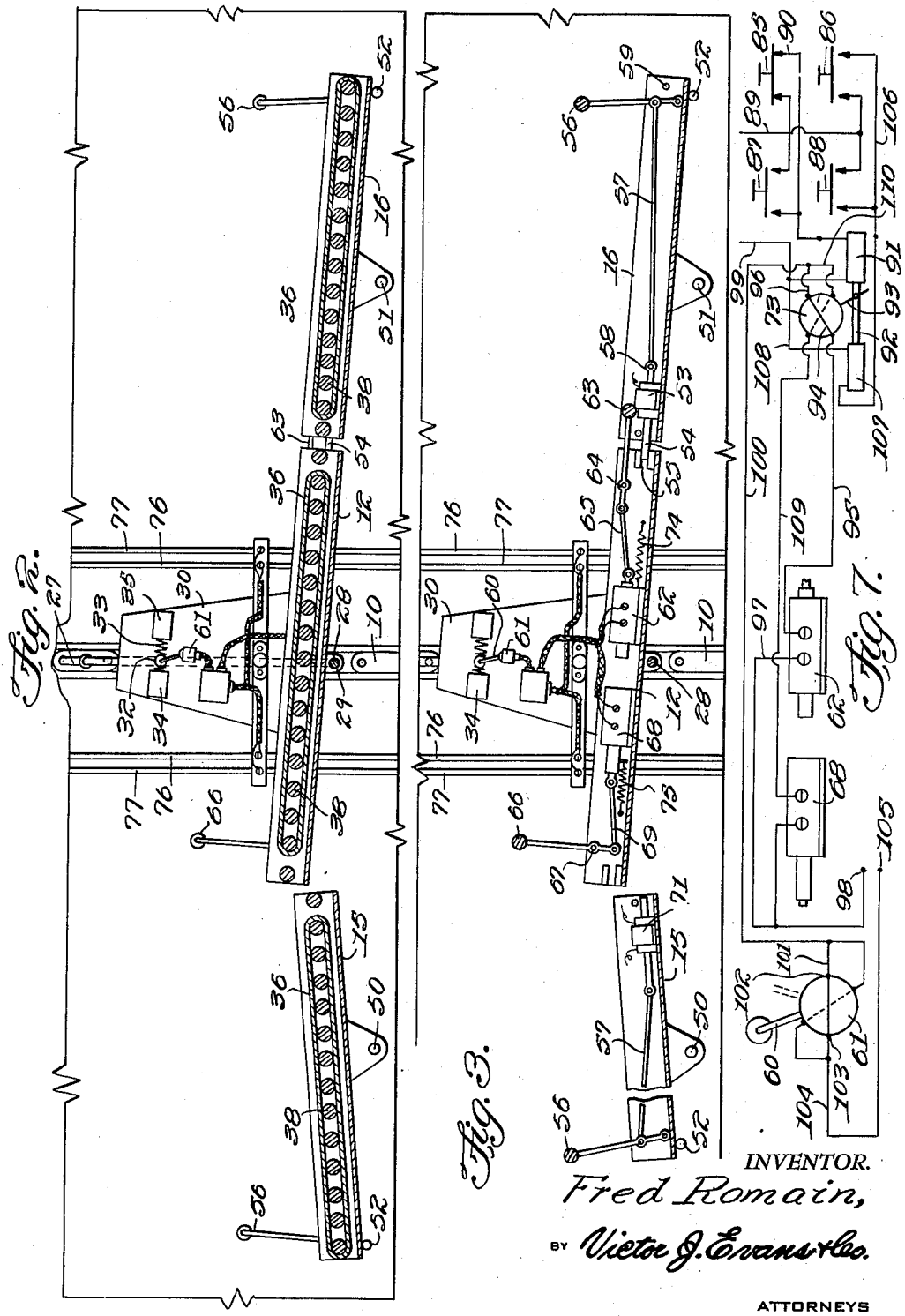

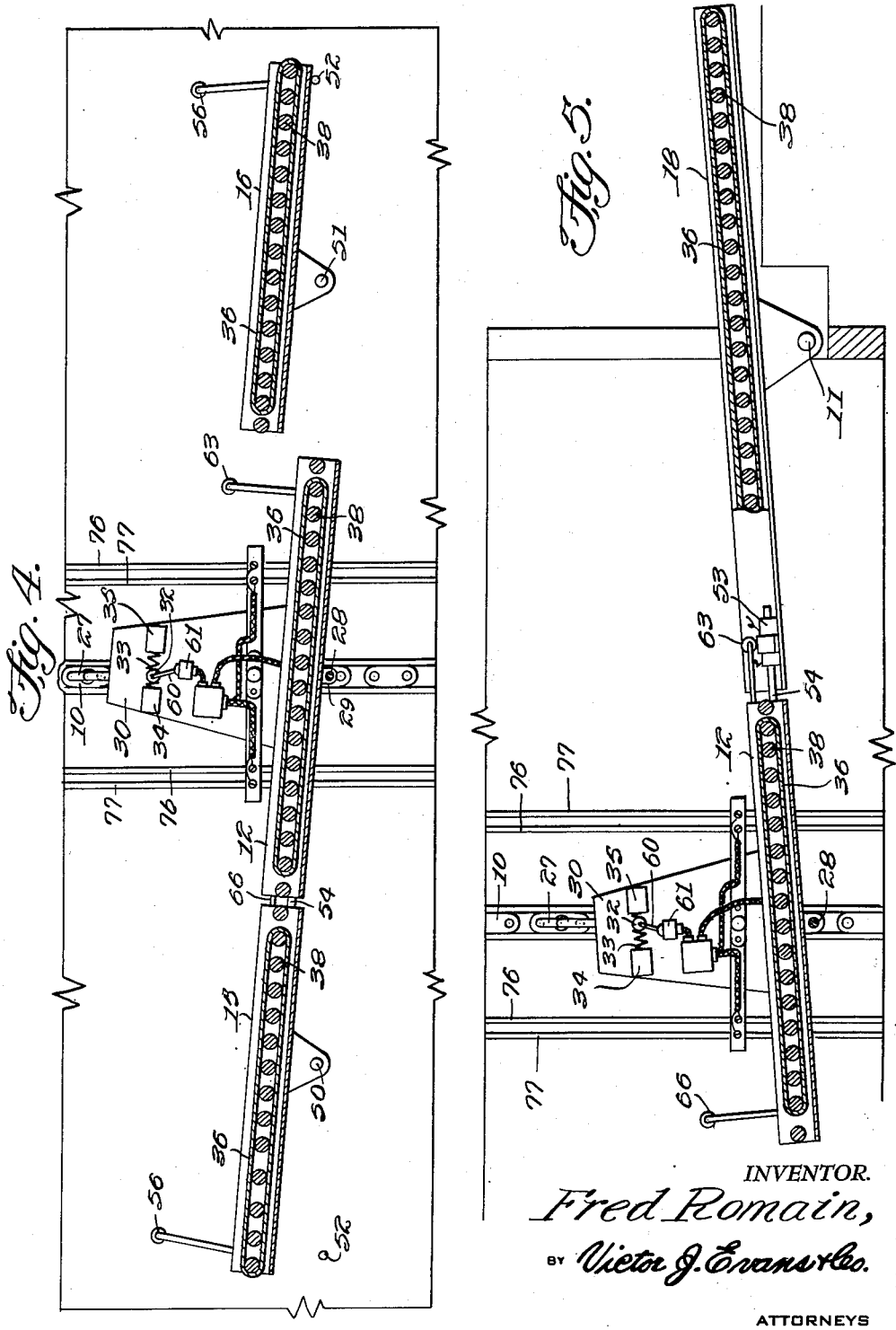

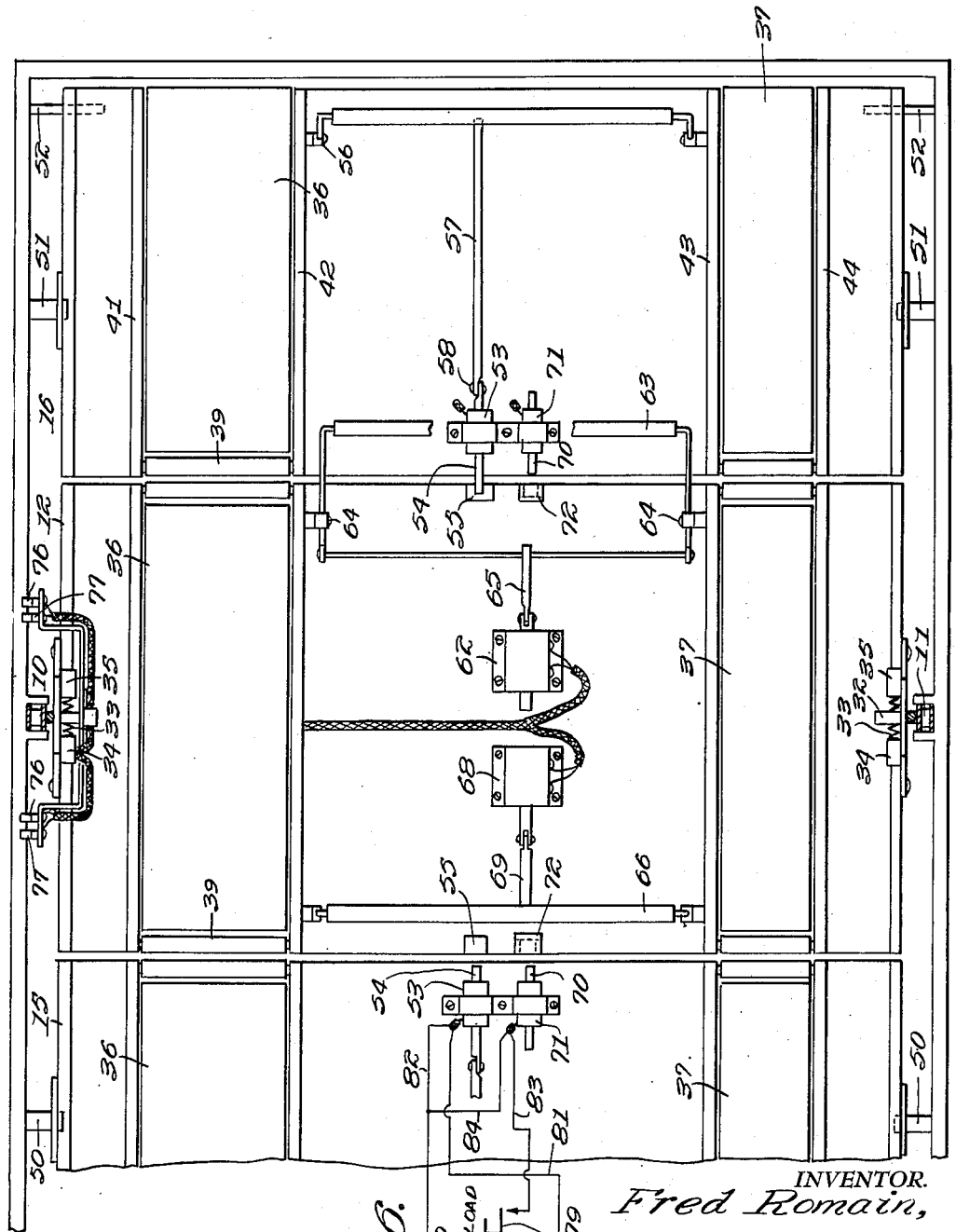

Dec. 22, 1953     F. ROMAIN     2,663,446
MOTOR VEHICLE PARKING ELEVATOR
Filed Nov. 9, 1949     5 Sheets-Sheet 5
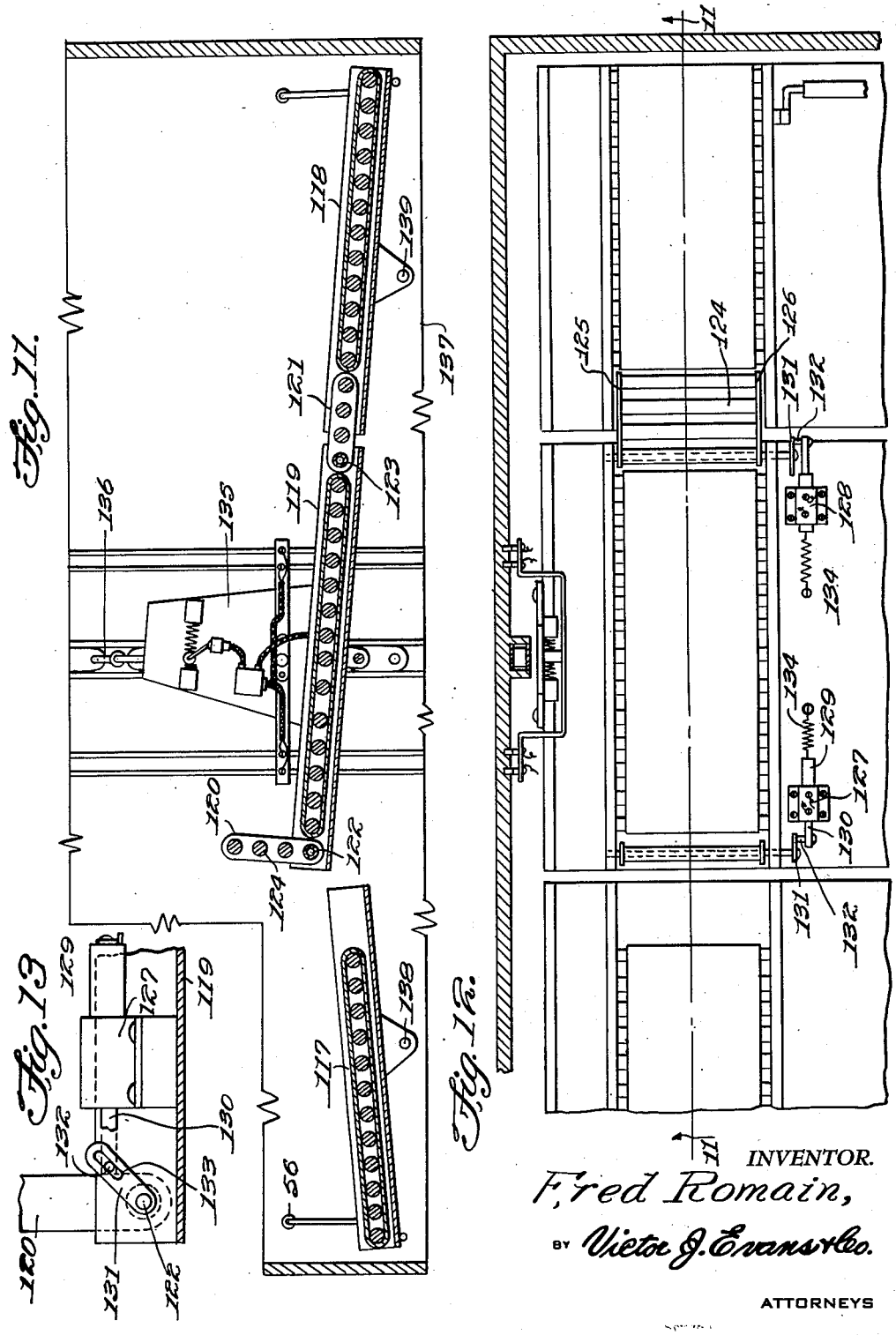
INVENTOR.
Fred Romain,
BY Victor J. Evans & Co.
ATTORNEYS Patented Dec. 22, 1953

2,663,446

UNITED STATES PATENT OFFICE 2,663,446

MOTOR VEHICLE PARKING ELEVATOR

Fred Romain, Chester, Mont.

Application November 9, 1949, Serial No. 126,383

7 Claims. (Cl. 214—16.1)

This invention relates to parking structures, buildings, garages and the like for parking tiers of motor vehicles, and in particular elevator means for automatically delivering cars to storing platforms and automatically recovering the cars from the platforms.

In the usual type of parking area where a motor vehicle travels on ramps or elevators considerable time is required in both parking and recovering the vehicle and quite a large number of attendants are required as it is necessary to send a new driver with each vehicle. With this thought in mind this invention contemplates a motor vehicle delivering and recovering elevator wherein cars are carried on platforms suspended between chains providing elevating and conveying means and wherein the platforms automatically deliver the cars to storage platforms and also automatically recover the cars from the platforms.

The object of this invention is, therefore, to provide means for storing and recovering motor vehicles in parking structures wherein an attendant controls the delivery and recovery of motor vehicles from a control panel.

Another object of the invention is to provide elevating means for depositing motor vehicles on platforms and in elevated positions wherein trips on platforms are set from a remote point to stop a platform on an elevator and actuate the platform to deliver a vehicle from the platform on the elevator to the storage platform.

Another object of the invention is to provide means in a combination elevator for storing and recovering motor vehicles wherein a storage platform upon which a vehicle is positioned may be set to actuate a tray on an elevator so that the vehicle on the storage platform is delivered to the tray.

Another object of the invention is to provide a motor vehicle parking device wherein a plurality of motor vehicle storage cages are suspended between continuous or endless chains.

A further object of the invention is to provide motor vehicle storage and recovering means in a parking structure that may be operated from a control panel which is of a comparatively simple and economical construction.

With these and other objects and advantages in view the invention embodies a pair of spaced endless chains trained over sprockets and provided with driving means with motor vehicle carrying trays suspended between the chains and with tiers of platforms on both sides of the chains and positioned to receive the vehicles from the trays.

Other features and advantages of the invention will appear from the following description taken in connection with the drawings wherein:

Figure 1 is a longitudinal section through a parking garage illustrating the operation of the storing and recovering elevator provided therein for carrying motor vehicles to storage platforms and also for recovering the vehicles from the platforms.

Figure 2 is a similar section on an enlarged scale illustrating a tray of the elevator positioned between two platforms and showing the vehicle conveying means of the platforms and trays in section.

Figure 3 is a similar section illustrating typical control devices for the trays and platforms.

Figure 4 is a section similar to that shown in Figure 2 showing the elevator tray in the position of receiving a vehicle from a platform at one side thereof.

Figure 5 is a similar section taken at the lower end of the garage illustrating a platform for delivering vehicles to a tray of the elevator with part of the platform broken away showing the control latches on the end thereof.

Figure 6 is a typical plan view showing an elevator tray with platforms at the sides thereof and with the end of one of the platforms broken away.

Figure 7 is a typical wiring diagram illustrating a method for controlling the delivery and recovery of the cars from a remote point.

Figure 8 is a detail showing one end of the elevator tray supporting bracket with the opposite end broken away.

Figure 9 is a detail showing the end of the tray supporting bracket with the chain in a horizontal position, and with parts broken away.

Figure 10 is a plan view of the tray bracket connection shown in Figure 9.

Figure 11 is a cross section through the elevator similar to that shown in Figure 2 taken on line 11—11 of Figure 12 showing a modification wherein movable track sections are provided at the ends of the tray over which vehicles run to and from the platforms.

Figure 12 is a plan view of the modified form of platforms and trays shown in Figure 11.

Figure 13 is a detail showing the means for operating the track sections shown in Figures 11 and 12.

Referring now to the drawings wherein like reference characters denote corresponding parts the parking garage of this invention includes a pair of endless chains 10 and 11 providing an elevator, a tray 12 suspended between the chains, platforms 13, 14, 15 and 16 positioned in tiers and arranged to receive vehicles from the tray 12 of the elevator, and entrance and delivery platforms 17 and 18 respectively positioned to deliver vehicles to the tray of the elevator from an entrance of the garage and to deliver vehicles from the elevator to an exit opening of the garage.

The chains 10 and 11 are trained over idler sprockets 19 which are journaled on shafts 20 extended from the sides of the garage and the chains are driven by a driving sprocket 21 on a shaft 22 rotated by a motor 23 through worm gears 24. With the chains arranged in this manner and using a reversible motor the chains may be driven in either direction to elevate and lower vehicles as may be desired. The horizontal sections of the chains are supported on tracks 25 on the side walls of the building.

The trays 12 are pivotally suspended between the chains 10 and 11 by U-shaped brackets 26, the upper ends of which are formed with horizontally disposed ends that are pivotally mounted on U-shaped brackets 27, the ends of which extend through the links of the chain, forming the pins thereof, as shown in Figures 8, 9, and 10. The lower horizontal members 28 of the brackets are pivotally attached to the lower surfaces of the tray by bearings 29. The trays 12 are provided with end plates 30 through which pins 31 on the brackets 26 extend, as illustrated in Figure 8 and the pins 31 are resiliently held between springs 32 and 33 which extend from blocks 34 and 35, respectively as illustrated in Figure 2.

The trays 12 and also the platforms 13, 14, 15 and 16 and the receiving and discharge platforms 17 and 18 are provided with roller conveyors having wide belts 36 at one side for the rear wheels of the vehicle and narrow belts 37 in the opposite sides for the front wheels of vehicles and, as illustrated in Fig. 2, the belts are trained over rollers 38 with idler rollers 39 at the ends and the rollers are rotatably mounted between rails, the wide belts 36 being positioned between rails 41 and 42 and the belts 37 between rails 43 and 44. The roller conveyors are similar in all of the different units and as roller conveyors of this type are used universally the same reference numerals are applied to the conveyors of the different trays and platforms.

As illustrated in the drawing the vehicles are driven on the platform 17 and as the tray 12 is lowered to the platform 17 the platform is tilted about a pivot 45 with the inner end stopping on stop pins 46 whereby, with the platform tilted, the vehicle or car will slide sidewise with the wheels on the conveyor belt whereby it is deposited upon the tray.

With the vehicle on the tray the motor 23 is started with the tray moving upwardly as illustrated on the right hand side of Figure 1 until a latch of one of the platforms, which had been set from a control panel to arrest the tray, engages the side of the tray 12 tilting the tray and platform so that the vehicle travels by gravity from the tray 12 to one of the platforms 16 as illustrated in Figure 1.

When it is desired to recover a vehicle from one of the platforms a latch of the platform from which the vehicle is desired is set to arrest the tray 12 and as the tray moves downwardly the edge of the tray will engage the latch of the platform tilting the platform and tray as illustrated on the left hand side of Figure 1 whereby the vehicle rolls by gravity from one of the platforms 13 to the tray 12, which is indicated in dotted lines. The elevator may then be operated to lower the vehicle to one of the platforms 17 or 18 from which the vehicle may be discharged.

As illustrated in Figure 1 of the drawing the trays 13 are pivotally mounted on shafts 47 in the side walls of the housing 48, the trays 14 are pivotally mounted on shafts 49, the platforms 15 on shafts 50, and the platform 16 on shafts 51. The platforms are held in the inwardly inclined or storage positions by stop pins 52 positioned on the sides of the frame.

As illustrated in Figure 6 a tray 12 is positioned between a platform 15 and a platform 16 and when it is desired to unload a vehicle from the tray 12 to a platform 16 a solenoid 53 is energized which throws a latch 54 outwardly in the path of a socket 55 on the tray 12 and at the same time draws a bumper 56 which is attached to a latch by rods 57 through a pin 58 forwardly to the position shown in Figure 3 wherein as the ascending tray passes the platform the latch 54 engages the socket 55, tilting the tray 12 and platform 16, as illustrated in Figure 3, so that a vehicle on the tray 12 passes by gravity on the conveyor belts 36 and 37 to the platform 16 where the vehicle engages the bumper 56 actuating the bumper against a stop pin 59 and at the same time withdrawing the latch 54. With the vehicle deposited upon the platform 16 the tray 12 is free to move to another position.

In this movement the tilting movement of the tray 12 causes the elements 34 on the end plate 30 of the tray to engage an arm 60 of a trip switch 61 which energizes a solenoid 62 on the platform and lowers a bumper 63 which is pivotally mounted on a pin 64 and connected to the core of the solenoid by a rod 65. By this means the bumper 63 which forms a gate at the end of the tray is moved downwardly to permit the vehicle to roll by gravity from the tray to the platform.

The tray is provided with another bumper 66 on the opposite side which is mounted on a pin 67 and connected to a solenoid 68 by a rod 69. This bumper is actuated in a similar manner when the tray is tilted to the opposite side.

When it is desired to recover the vehicle from the platform 16 the spring actuated latch 70 is extended by a solenoid 71 so that it is in the path of the descending tray 12 and as a socket 72 on the tray engages an extended end of the latch 70 the tray and platform are tilted in the opposite direction whereby the vehicle rolls by gravity from the platform to the tray with the vehicle engaging the bumper 66 on the opposite side of the tray. For this action the circuits of the contact arms 60 are reversed through a double throw switch 73 whereby the arm 60 lowers the bumper 63 and the bumper 66 is retained in the upwardly extended position. The cores of the solenoids 62 and 68 are provided with springs 74 and 75, respectively, for retaining the bumpers or gates 63 and 66 in upwardly extended positions and when the position of the arm 60 is neutral the solenoid is deenergized. Circuits to the solenoids 62 and 68 are carried through rails 76 and 77 positioned at the end of the elevator and on opposite sides of the chain.

As illustrated in the wiring diagram shown in Figure 6 the latch elements on the platforms are actuated by buttons 78 and 79 with one button of the switch 78 connected to a source of current by a wire 80 and the other to the solenoid 53 by a wire 81. The opposite terminal of the solenoid 53 is connected by a wire 82 to the source of current. In this same manner the button 79 is also connected to the wire 80 for the current supply and to the solenoid 71 through a wire 83 with the opposite terminal of the solenoid 71 connected by a wire 84 to the source of current through the wire 82. The buttons 78 and 79 are positioned on a panel with a pair of buttons for each of the platforms 13, 14, 15, and 16.

A typical wiring diagram for the solenoids 62 and 68 on the tray 12 is illustrated in Figure 7 wherein a loading button 85 and an unloading button 86 for one side of the elevator are provided on a panel and an unloading button 87 and a loading button 88 for the opposite side of the elevator are also provided on the panel. The inner contacts of the buttons are illustrated as connected to a source of current through a wire 89 and with the button 85 closed, as shown in the drawings, a circuit is completed through a wire 90 to a solenoid 91 which, through the core 92 draws the arm 93 of the switch 73 to the position shown in full lines whereby a circuit is completed in the solenoid 62 through the knife 94 of the switch which engages the terminals of wires 95 and 96 and with the wire 95 connected to one terminal of the solenoid 62. The other terminal of the solenoid is connected by a wire 97 to a source of current supply through a brush 98 that travels on one of the buss or contact bars 76 or 67. The other terminal of the solenoid 91 is connected to a source of current supply through a wire 99 and the wire 96 is connected by a wire 100 to the terminal 102 of the switch 61 with the opposite terminal 103 connected by a wire 104 to a brush 105 which also contacts one of the bars 76 or 77 and is thereby connected to the source of current supply.

By the same means the unloading button 86 is connected by a wire 106 to the solenoid 107, the opposite terminal of which is connected to the wire 83 through a wire 108 and as current is applied to this solenoid the knife bar 94 of the switch 73 is thrown to complete a circuit to the other pair of terminals whereby current is supplied through the wires 109 and 110, to the solenoid 68 which controls the latch and bumper 66 on the opposite side of the tray. Tilting of the tray 12 in the opposite direction moves the arm 60 over to the position indicated in dotted lines in Figure 7 whereby the circuit is completed to the solenoid 68, as described. The buttons 87 and 88 are connected in a similar manner to the solenoids 62 and 68 so that the operation of the elevator tray is positively controlled thereby.

With the parts arranged in this manner the vehicles are driven on the platforms 17 and 18 and slid from these platforms to the elevator tray from which they are delivered to platforms upon which vehicles are not positioned and, as illustrated and described these platforms are controlled from a control panel. The vehicles are recovered in the same manner and although the vehicles may enter the garage or may be delivered therefrom from either side it is preferred to use the platform 17 for vehicles entering the garage and the platform 18 for delivering vehicles from the garage. The platform 18 is pivotally mounted on a pin 111 and a stop 112 is provided for limiting downward movement of the inner end thereof.

An open chamber 113 is provided below the elevator whereby the tray 12 with a vehicle thereon may travel across the lower end of the elevator and with the drive shaft in the center of the bottom the tray may also travel across the upper end.

The outer ends of the platforms 13 and 16 are positioned relatively close to end walls 114 and 115 so that it is impossible for vehicles to drop between the platforms and walls should one of the bumpers fail to operate and the inner platforms 14 and 15 are positioned with the inner ends thereof adjacent a center wall 116 which also prevents vehicles from dropping from the inner ends of the platform.

In the design illustrated in Figures 11, 12 and 13 the idler rollers at the inner end of the platforms which are indicated by the numerals 117 and 118, are omitted and the idler rollers at the ends of the tray, which are indicated by the numeral 119, are replaced by track sections 120 and 121 which are pivotally mounted on shafts 122 and 123, respectively, and these sections, each of which is formed with rollers 124 rotatably mounted between side rails 125 and 126, are actuated by solenoids 127 and 128, in the opposite ends of the tray 119, as shown in Figure 13.

The core 129 of each solenoid is connected by a rod 130 to an arm 131 through a pin 132 in a slot 133 in the arm, as shown in Figure 13. As the solenoid is energized the coil 129, through the rod 130, forces the arm 131 outwardly with the section, as indicated by the numeral 120 in Figure 13, moving downwardly to the horizontal position as indicated by the section 121 in Figure 11. When the circuit to the solenoid is broken springs 134 draw the cores inwardly and the sections 120 and 121 are actuated to vertical positions.

In this design the tray 119 is provided with end plates 135 and the tray is suspended from a chain 136 by a bracket similar to that illustrated in Figure 8. The platforms 117 and 118 are similar to the platforms 15 and 16, and in the design shown in Figure 11 these platforms are pivotally mounted in a housing 137 on shafts 138 and 139.

With the tray of this design the ends of the tray engage the ends of the platform similar to the tray illustrated in Figures 4 and 5 and the bumpers 56 at the outer ends of the tray operate in a similar manner.

It will be understood that modifications may be made in the design and arrangement of the parts without departing from the spirit of the invention.

It will also be understood that although the parking device is illustrated and described as provided in a building or garage, it may also be provided as an independent frame or structure without an enclosure and may be positioned on an open lot. These devices may be provided in comparatively small units and distributed throughout a city to provide convenient parking areas within reach of the principal points of a city or the like.

What is claimed is:

1. A motor vehicle storage frame comprising spaced pairs of tiers of vehicle receiving platforms, an elevator having spaced vertically disposed chains with said chains positioned between a pair of the said tiers of platforms, chains supporting elements journaled in the frame, a vehicle carrying tray carried by the chains of the elevator, spaced endless conveyor belts trained over rollers on the tray, spaced endless conveyor belts also trained over rollers on the platforms,